(12) United States Patent
Ito et al.

(10) Patent No.: US 9,023,913 B2
(45) Date of Patent: May 5, 2015

(54) CURABLE RESIN COMPOSITION, CURABLE RESIN MOLDED BODY, CURED RESIN MOLDED BODY, METHOD FOR PRODUCING EACH OF SAME, AND LAMINATE BODY

(71) Applicant: Lintec Corporation, Tokyo (JP)

(72) Inventors: Masaharu Ito, Tokyo (JP); Wataru Iwaya, Tokyo (JP); Hironobu Fujimoto, Tokyo (JP); Naoki Taya, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 14/365,930

(22) PCT Filed: Dec. 11, 2012

(86) PCT No.: PCT/JP2012/082051
§ 371 (c)(1),
(2) Date: Jun. 16, 2014

(87) PCT Pub. No.: WO2013/089091
PCT Pub. Date: Jun. 20, 2013

(65) Prior Publication Data
US 2014/0364531 A1 Dec. 11, 2014

(30) Foreign Application Priority Data

Dec. 16, 2011 (JP) ................................. 2011-276246

(51) Int. Cl.
| | | |
|---|---|---|
| C08F 2/46 | (2006.01) | |
| C08F 2/50 | (2006.01) | |
| B29C 71/04 | (2006.01) | |
| A61L 2/08 | (2006.01) | |
| A61L 24/00 | (2006.01) | |
| C08L 33/04 | (2006.01) | |
| B29C 39/00 | (2006.01) | |
| C08J 5/18 | (2006.01) | |
| C08L 35/02 | (2006.01) | |
| C08L 69/00 | (2006.01) | |
| C08L 81/06 | (2006.01) | |
| B29K 33/04 | (2006.01) | |
| B29K 35/00 | (2006.01) | |
| B29K 69/00 | (2006.01) | |
| B29K 81/00 | (2006.01) | |
| B29K 105/00 | (2006.01) | |
| B29K 105/24 | (2006.01) | |
| C08F 226/00 | (2006.01) | |
| C08F 220/30 | (2006.01) | |
| C08F 222/10 | (2006.01) | |

(52) U.S. Cl.
CPC .............. *C08L 33/04* (2013.01); *B29C 39/006* (2013.01); *B29K 2033/04* (2013.01); *B29K 2035/00* (2013.01); *B29K 2069/00* (2013.01); *B29K 2081/06* (2013.01); *B29K 2105/0002* (2013.01); *B29K 2105/0073* (2013.01); *B29K 2105/0088* (2013.01); *B29K 2105/246* (2013.01); *B29K 2867/003* (2013.01); *B29K 2995/0017* (2013.01); *C08J 5/18* (2013.01); *C08J 2333/04* (2013.01); *C08J 2335/02* (2013.01); *C08J 2369/00* (2013.01); *C08J 2381/06* (2013.01); *C08J 2433/14* (2013.01); *C08J 2435/02* (2013.01); *C08J 2439/04* (2013.01); *C08J 2481/06* (2013.01); *C08L 35/02* (2013.01); *C08L 69/00* (2013.01); *C08L 81/06* (2013.01); *C08F 2/50* (2013.01); *C08F 226/00* (2013.01); *C08F 2220/301* (2013.01); *C08F 2222/1013* (2013.01); *C08F 2222/102* (2013.01)

(58) Field of Classification Search
USPC ................... 522/64, 6, 71, 189, 184, 1; 520/1
See application file for complete search history.

(56) References Cited

FOREIGN PATENT DOCUMENTS

| | | | |
|---|---|---|---|
| JP | 6-16720 | A | 1/1994 |
| JP | 7-300559 | A | 11/1995 |
| JP | 10-77321 | A | 3/1998 |
| JP | 2002-256039 | * | 9/2002 |
| JP | 2002-256039 | A | 9/2002 |

(Continued)

OTHER PUBLICATIONS

Kubo et al, JP 2002-256039 Machine Translation, Sep. 11, 2002.*
International Search Report, mailed Mar. 26, 2013, issued in PCT/JP2012/082051.

*Primary Examiner* — Ling Choi
*Assistant Examiner* — Jessica E Whiteley
(74) *Attorney, Agent, or Firm* — Birch, Stewart, Kolasch & Birch, LLP

(57) ABSTRACT

The present invention is: a curable resin composition comprising a thermoplastic resin (A), a curable monomer (B), and a photoinitiator (C), the thermoplastic resin (A) including an aromatic ring in its molecule, and having a glass transition temperature (Tg) of 140° C. or more, and the photoinitiator (C) having an absorbance at 380 nm of 0.4 or more when measured in a 0.1 mass % acetonitrile solution; a curable resin formed article obtained by forming the curable resin composition; a cured resin formed article obtained by curing the curable resin formed article; a laminate comprising at least one layer that is formed of a cured resin obtained by curing the curable resin composition. The present invention provides: a cured resin formed article that exhibits excellent heat resistance, includes only a small amount of residual low-boiling-point substance (e.g., solvent and curable monomer), and has small in-plane retardation, a method for producing the same, a curable resin composition and a curable resin formed article that are useful as a raw material for producing the cured resin formed article, and a laminate that includes a layer formed of a cured resin.

14 Claims, No Drawings

(56) References Cited

FOREIGN PATENT DOCUMENTS

| JP | 2002-296773 A | 10/2002 |
|----|---------------|---------|
| JP | 2002-328471 A | 11/2002 |
| JP | 2003-26715 A | 1/2003 |
| JP | 2007-254620 A | 10/2007 |
| JP | 2009-192632 A | 8/2009 |
| JP | 2010-20077 A | 1/2010 |
| JP | 2012-8547 A | 1/2012 |

* cited by examiner

CURABLE RESIN COMPOSITION, CURABLE RESIN MOLDED BODY, CURED RESIN MOLDED BODY, METHOD FOR PRODUCING EACH OF SAME, AND LAMINATE BODY

TECHNICAL FIELD

The invention relates to a cured resin formed article that exhibits excellent heat resistance, includes only a small amount of residual low-boiling-point substance, and has small in-plane retardation, a method for producing the same, a curable resin composition and a curable resin formed article that are useful as a raw material for producing the cured resin formed article, and a laminate that includes a layer formed of a cured resin.

BACKGROUND ART

In recent years, use of a transparent plastic film as an electrode substrate instead of a glass sheet has been studied for displays (e.g., liquid crystal display and electroluminescence (EL) display) in order to implement a reduction in thickness, a reduction in weight, an improvement in flexibility, and the like.

A transparent plastic film used for these applications is normally required to have heat resistance and small in-plane retardation.

A melt extrusion method and a solution casting method have been known as a method for producing an optical film. In particular, the solution casting method has been considered to be a promising method for producing an optical film since the solution casting method can produce a flat and smooth film having small in-plane retardation.

When producing a film by the solution casting method using a resin having a high glass transition temperature, the solvent may volatilize to only a small extent, and the resulting film may include a large amount of residual solvent, and tends to curl.

Patent Document 1 discloses a method that produces a polyethersulfone film that includes a small amount of residual solvent using a solution casting method that utilizes a solution composition in which an aromatic polyethersulfone is dissolved in a solvent that includes 1,3-dioxolane.

However, since the drying step is performed while continuously increasing the heating temperature (see the examples of Patent Document 1), the drying step takes time, and productivity decreases.

Patent Document 2 discloses a resin composition that includes an amorphous thermoplastic resin (e.g., polycarbonate or polyethersulfone) and a bis(meth)acrylate that can be cured by applying active energy rays as a resin composition that may be used as an alternative to glass, and exhibits good chemical resistance and heat resistance. A member obtained using the resin composition is described in the examples of Patent Document 2. However, the member has a thickness as large as 1 mm. Patent Document 2 discloses a thermoplastic resin that includes an aromatic ring (e.g., polycarbonate and polyethersulfone) as the amorphous thermoplastic resin. However, Patent Document 2 does not provide production examples of a resin composition including a thermoplastic resin that includes an aromatic ring, and a member that utilizes such a resin composition.

RELATED-ART DOCUMENT

Patent Document

Patent Document 1: JP-A-7-300559
Patent Document 2: JP-A-10-77321

SUMMARY OF THE INVENTION

Technical Problem

The invention was conceived in view of the above situation. An object of the invention is to provide a cured resin formed article that exhibits excellent heat resistance, includes only a small amount of residual low-boiling-point substance (e.g., solvent and curable monomer), and has small in-plane retardation, a method for producing the same, a curable resin composition and a curable resin formed article that are useful as a raw material for producing the cured resin formed article, and a laminate that includes a layer formed of a cured resin.

Solution to Problem

The inventors of the invention conducted extensive studies in order to achieve the above object. As a result, the inventors found that a cured resin formed article that exhibits excellent heat resistance, includes only a small amount of residual low-boiling-point substance, and has small in-plane retardation, can be obtained by utilizing a curable resin composition that includes a thermoplastic resin that includes an aromatic ring in its molecule and has a glass transition temperature (Tg) of 140° C. or more, a curable monomer, and a photoinitiator that has an absorption band at around 380 nm (i.e., has photopolymerization activity for light having a wavelength of about 380 nm). The inventors also found that a film-like cured resin formed article obtained using the curable resin composition can be efficiently produced by forming a curable resin layer on a casting sheet using the curable resin composition, and curing the curable resin layer. These findings have led to the completion of the invention.

A first aspect of the invention provides the following curable resin composition (see (1) to (6)).

(1) A curable resin composition including a thermoplastic resin (A), a curable monomer (B), and a photoinitiator (C),
  the thermoplastic resin (A) including an aromatic ring in its molecule, and having a glass transition temperature (Tg) of 140° C. or more, and
  the photoinitiator (C) having an absorbance at 380 nm of 0.4 or more when measured in a 0.1 mass % acetonitrile solution.

(2) The curable resin composition according to (1), wherein the thermoplastic resin (A) is an amorphous thermoplastic resin.

(3) The curable resin composition according to (1) or (2), wherein the photoinitiator (C) is a phosphorus-based photoinitiator represented by the following formula,

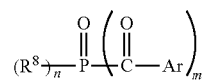

wherein $R^8$ is a substituted or unsubstituted phenyl group or a substituted or unsubstituted alkyl group having 1 to 10 carbon atoms, Ar is a substituted or unsubstituted aromatic group having 6 to 20 carbon atoms, m is an integer from 1 to 3, and n is an integer from 0 to 2, provided that m+n is 3.

(4) The curable resin composition according to any one of (1) to (3), the curable resin composition including the thermoplastic resin (A) and the curable monomer (B) in a mass ratio (thermoplastic resin (A):curable monomer (B)) of 3:7 to 9:1.

(5) The curable resin composition according to any one of (1) to (4), the curable resin composition including the photoinitiator (C) in a ratio of 0.05 to 15 mass % based on the thermoplastic resin (A) and the curable monomer (B) in total.

(6) The curable resin composition according to any one of (1) to (5), wherein the thermoplastic resin (A) is a thermoplastic resin selected from the group consisting of a polysulfone-based resin, a polyarylate-based resin, and a polycarbonate-based resin.

A second aspect of the invention provides the following curable resin formed article (see (7) and (8)).

(7) A curable resin formed article obtained by forming the curable resin composition according to any one of (1) to (6).

(8) The curable resin formed article according to (7), the curable resin formed article being a film-like article.

A third aspect of the invention provides the following cured resin formed article (see (9) and (10)).

(9) A cured resin formed article obtained by curing the curable resin formed article according to (7) or (8).

A fourth aspect of the invention provides the following method for producing a cured resin formed article (see (10) and (11)).

(10) A method for producing the cured resin formed article according to (9), the method including:
   a step 1 that forms a curable resin layer on a casting sheet, the curable resin layer being formed of the curable resin composition that includes the thermoplastic resin (A), the curable monomer (B), and the photoinitiator (C); and
   a step 2 that cures the curable resin layer obtained by the step 1 to form a cured resin layer.

(11) The method according to (10), wherein the step 2 cures the curable resin layer by applying active energy rays at a dose of 50 to 10,000 mJ/cm$^2$ to the curable resin layer.

(12) The method according to (11), wherein the step 2 applies the active energy rays to the curable resin layer through a filter that blocks light having a wavelength of 320 nm or less.

A fifth aspect of the invention provides the following laminate (see (13)).

(13) A laminate including at least one layer that is formed of a cured resin obtained by curing the curable resin composition according to any one of (1) to (6).

Advantageous Effects of the Invention

A curable resin formed article can be efficiently obtained by utilizing the curable resin composition according to the first aspect of the invention, and a cured resin formed article that exhibits excellent heat resistance, includes only a small amount of residual low-boiling-point substance (e.g., solvent and unreacted monomer), and has small in-plane retardation can be efficiently obtained by curing the curable resin formed article.

The cured resin formed article (film-like article) according to the third aspect of the invention may be used as a layer that is included in a laminate. The laminate may suitably be used for an electrode material for a touch panel and the like, a flat-screen television, an optical recording medium, and an optical sheet material.

The method for producing a cured resin formed article according to the fourth aspect of the invention can efficiently produce a cured resin formed article that exhibits excellent heat resistance, includes only a small amount of residual low-boiling-point substance, and has small in-plane retardation.

In particular, when the cured resin formed article is in the shape of a film, the cured resin formed article exhibits excellent heat resistance, includes only a small amount of residual low-boiling-point substance, curls to only a small extent, and has small in-plane retardation. Therefore, the cured resin formed article may be useful as a resin film for producing an optical member or an electronic device member.

DESCRIPTION OF EMBODIMENTS

A curable resin composition, a curable resin formed article, a cured resin formed article, a method for producing a cured resin formed article, and a laminate according to several exemplary embodiments of the invention are described in detail below.

1) Curable Resin Composition

A curable resin composition according to one embodiment of the invention includes a thermoplastic resin (A), a curable monomer (B), and a photoinitiator (C), the thermoplastic resin (A) including an aromatic ring in its molecule, and having a glass transition temperature (Tg) of 140° C. or more, and the photoinitiator (C) having an absorbance at 380 nm of 0.4 or more when measured in a 0.1 mass % acetonitrile solution.

Thermoplastic Resin (A)

The thermoplastic resin (A) includes an aromatic ring in its molecule, and has a glass transition temperature (Tg) of 140° C. or more.

The aromatic ring included in the thermoplastic resin (A) is not particularly limited. The aromatic ring included in the thermoplastic resin (A) is preferably a benzene ring, a biphenyl ring, a naphthalene ring, a terphenyl ring, or an anthracene ring, more preferably a benzene ring, a biphenyl ring, or a naphthalene ring, and particularly preferably a benzene ring, from the viewpoint of availability of the raw material.

A cured resin formed article that exhibits excellent heat resistance can be obtained by utilizing a thermoplastic resin that includes an aromatic ring.

The glass transition temperature (Tg) of the thermoplastic resin (A) is 140° C. or more, and preferably 150° C. or more. When the glass transition temperature (Tg) of the thermoplastic resin (A) is 140° C. or more, a cured resin formed article that exhibits excellent heat resistance can be obtained. The upper limit of the glass transition temperature (Tg) of the thermoplastic resin (A) is not particularly limited, but is normally 350° C. or less.

The term "glass transition temperature (Tg)" used herein refers to a temperature that corresponds to the maximum tan δ value (loss modulus/storage modulus) obtained by viscoelasticity measurement.

The thermoplastic resin (A) is preferably an amorphous thermoplastic resin. When the thermoplastic resin (A) is an amorphous thermoplastic resin, a cured resin formed article that exhibits excellent transparency can be obtained. Since an amorphous thermoplastic resin exhibits excellent solubility in an organic solvent, a cured resin formed article can be efficiently formed by utilizing a solution casting method (described later). Note that the term "amorphous thermoplastic resin" used herein refers to a thermoplastic resin for which a melting point is not observed by differential scanning calorimetry.

The weight average molecular weight (Mw) of the thermoplastic resin (A) is normally 8000 to 3,000,000, preferably 10,000 to 2,000,000, and more preferably 10,000 to 2,000, 000. The molecular weight distribution (Mw/Mn) of the thermoplastic resin (A) is preferably 1.0 to 5.0, and more preferably 2.0 to 4.5. Note that the terms "weight average molecular weight (Mw)" and "molecular weight distribution (Mw/Mn)" used herein refer to values determined by gel permeation chromatography (GPC) relative to a polystyrene standard (i.e., polystyrene-reduced values).

Specific examples of the thermoplastic resin (A) include a polysulfone-based resin, a polyarylate-based resin, a polycarbonate-based resin, and the like.

The term "polysulfone-based resin" used herein refers to a polymer that includes a sulfone group ($—SO_2—$) in the main chain. The polysulfone-based resin is not particularly limited. A known polysulfone-based resin may be used. Examples of the polysulfone-based resin include a resin that includes a polymer compound including a repeating unit among the repeating units respectively represented by the following formulas (a) to (h).

aromatic dicarboxylic acid or a chloride thereof. The polyarylate-based resin is not particularly limited. A known polyarylate-based resin may be used. The reaction method is not particularly limited. For example, a melt polymerization method, a solution polymerization method, or an interfacial polymerization method may be used.

Examples of the aromatic diol include bis(hydroxyphenyl) alkanes such as bis(4-hydroxyphenyl)methane (bisphenol F), bis(3-methyl-4-hydroxyphenyl)methane, 1,1-bis(4'-hydroxyphenyl)ethane, 1,1-bis(3'-methyl-4'-hydroxyphenyl)ethane, 2,2-bis(4'-hydroxyphenyl)propane (bisphenolA), 2,2-bis(3'-methyl-4'-hydroxyphenyl)propane, 2,2-bis(4'-hydroxyphenyl)butane, and 2,2-bis(4'-hydroxyphenyl)octane; bis(hydroxyphenyl)cycloalkanes such as 1,1-bis(4'-hydroxyphenyl)cyclopentane, 1,1-bis(4'-hydroxyphenyl) cyclohexane (bisphenol Z), and 1,1-bis(4'-hydroxyphenyl)-3,3,5-trimethylcyclohexane; bis(hydroxyphenyl) phenylalkanes such as bis(4-hydroxyphenyl)phenylmethane,

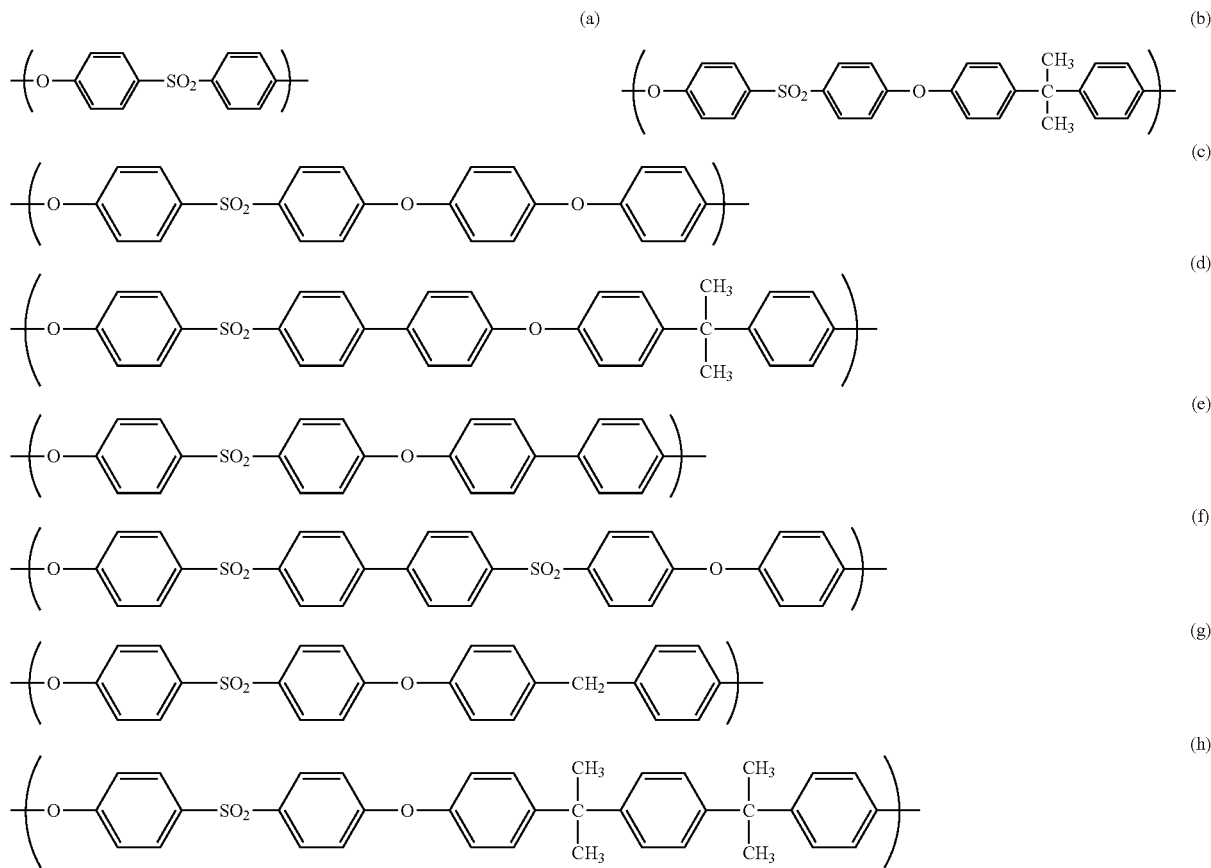

Specific examples of the polysulfone-based resin include a polyethersulfone resin (i.e., a resin that includes a polymer compound including the repeating unit represented by the formula (a)), a polysulfone resin (i.e., a resin that includes a polymer compound including the repeating unit represented by the formula (b)), a polyphenylsulfone resin (i.e., a resin that includes a polymer compound including the repeating unit represented by the formula (e)), and the like. The polysulfone-based resin may be a modified polysulfone-based resin.

A polyethersulfone resin or a polysulfone resin is preferable as the polysulfone-based resin.

The polyarylate-based resin is a resin that includes a polymer compound obtained by reacting an aromatic diol with an bis(3-methyl-4-hydroxyphenyl)phenylmethane, bis(2,6-dimethyl-4-hydroxyphenyl)phenylmethane, bis(2,3,6-trimethyl-4-hydroxyphenyl)phenylmethane, bis(3-t-butyl-4-hydroxyphenyl)phenylmethane, bis(3-phenyl-4-hydroxyphenyl)phenylmethane, bis(3-fluoro-4-hydroxyphenyl)phenylmethane, bis(3-bromo-4-hydroxyphenyl)phenylmethane, bis(4-hydroxyphenyl)-4-fluorophenylmethane, bis(3-fluoro-4-hydroxyphenyl)-4-fluorophenylmethane, bis(4-hydroxyphenyl)-4-chlorophenylmethane, bis(4-hydroxyphenyl)-4-bromophenylmethane, bis(3,5-dimethyl-4-hydroxyphenyl)-4-fluorophenylmethane, 1,1-bis(4'-hydroxyphenyl)-1- phenylethane (bisphenol P), 1,1-bis(3'-methyl-4'-hydroxyphenyl)-1-phenylethane, 1,1-bis(3'-t-butyl-4'-hydroxyphenyl)-1-phenylethane, 1,1-bis(3'-phenyl-4'-hydroxyphenyl)-1-phenylethane, 1,1-bis(4'-hydroxyphenyl)-1-(4'-nitrophenyl)ethane, 1,1-bis(3'-bromo-4'-hydroxyphenyl)-1-phenylethane, 1,1-bis(4'-hydroxyphenyl)-1-phenylpropane, bis(4-hydroxyphenyl) diphenylmethane, and bis(4-hydroxyphenyl) dibenzylmethane; bis(hydroxyphenyl) ethers such as bis(4-hydroxyphenyl) ether and bis(3-methyl-4-hydroxyphenyl) ether; bis(hydroxyphenyl) ketones such as bis(4-hydroxyphenyl) ketone and bis(3-methyl-4-hydroxyphenyl) ketone; bis(hydroxyphenyl) sulfides such as bis(4-hydroxyphenyl) sulfide and bis(3-methyl-4-hydroxyphenyl) sulfide; bis(hydroxyphenyl) sulfoxides such as bis(4-hydroxyphenyl) sulfoxide and bis(3-methyl-4-hydroxyphenyl) sulfoxide; bis(hydroxyphenyl)sulfones such as bis(4-hydroxyphenyl) sulfone (bisphenol S) and bis(3-methyl-4-hydroxyphenyl) sulfone; bis(hydroxyphenyl)fluorenes such as 9,9-bis(4'-hydroxyphenyl)fluorene and 9,9-bis(3'-methyl-4'-hydroxyphenyl)fluorene; and the like.

Examples of the aromatic dicarboxylic acid or a chloride thereof include phthalic acid, isophthalic acid, terephthalic acid, 4,4'-biphenyldicarboxylic acid, diphenoxyethanedicarboxylic acid, diphenyl ether 4,4'-dicarboxylic acid, 4,4'-diphenylsulfonedicarboxylic acid, 1,5-napthalenedicarboxylic acid, 2,6-napthalenedicarboxylic acid, chlorides thereof, and the like.

The polyarylate-based resin may be a modified polyarylate-based resin.

A resin that includes a polymer compound obtained by reacting 2,2-bis(4'-hydroxyphenyl)propane with isophthalic acid is preferable as the polyarylate-based resin.

The term "polycarbonate-based resin" used herein refers to a polymer that includes a carbonate group (—O—C(=O)—O—) in the main chain.

The polycarbonate-based resin is not particularly limited. A known aromatic polycarbonate resin may be used as the polycarbonate-based resin.

The aromatic polycarbonate resin may be obtained by reacting an aromatic diol and a carbonate precursor using an interfacial polycondensation method or a melt transesterification method, or polymerizing a carbonate prepolymer using a solid-phase transesterification method, or polymerizing a cyclic carbonate compound using a ring-opening polymerization method, for example.

Examples of the aromatic diol include those mentioned above in connection with the polyarylate-based resin.

Examples of the carbonate precursor include a carbonyl halide, a carbonate ester, a haloformate, and the like. Specific examples of the carbonate precursor include phosgene, a diphenyl carbonate, a dihaloformate of a dihydric phenol, and the like.

These thermoplastic resins (A) may be used either alone or in combination.

Curable Monomer (B)

The curable monomer (B) is a monomer that includes a polymerizable unsaturated bond, and can be involved in a polymerization reaction, or a polymerization reaction and a crosslinking reaction, in the presence of the photoinitiator (C). Note that the term "curing" used herein is a broad concept that includes a polymerization reaction of a monomer, or a polymerization reaction of a monomer, and the subsequent crosslinking reaction of the polymer.

When producing a film-like curable resin formed article (hereinafter may be referred to as "curable resin film") using the curable resin composition according to one embodiment of the invention, the curable resin film is plasticized when the curable resin composition includes a curable monomer. For example, when producing a curable resin film using a solution casting method or the like, the curable resin film is plasticized when the curable resin composition includes a monofunctional curable monomer (B). This makes it possible to efficiently remove the solvent molecules from the curable resin film during drying. Therefore, an increase in drying time that may occur when using the thermoplastic resin (A) having a high glass transition temperature (Tg), and curling due to a residual solvent that may occur when producing a film-like formed article can be solved by utilizing the curable resin composition according to one embodiment of the invention that includes the curable monomer (B).

The molecular weight of the curable monomer (B) is preferably 3000 or less, more preferably 200 to 2000, and still more preferably 200 to 1000.

The number of polymerizable unsaturated bonds included in the curable monomer (B) is not particularly limited. The curable monomer (B) may be a monofunctional monomer, or may be a polyfunctional monomer. It is preferable to use a polyfunctional curable monomer from the viewpoint of heat resistance since the heat resistance is improved due to a crosslinked structure. The content of the polyfunctional curable monomer in the curable monomer (B) is preferably 40 mass % or more, and more preferably 50 to 100 mass %.

The polymerizable unsaturated bond is not particularly limited as long as the polymerizable unsaturated bond can be involved in the curing reaction. It is preferable that the polymerizable unsaturated bond be included in a (meth)acryloyl group due to excellent reactivity. Note that the term "(meth)acryloyl group" refers to "acryloyl group" or "methacryloyl group".

A monofunctional (meth)acrylic acid derivative or a polyfunctional (meth)acrylic acid derivative may preferably be used as the curable monomer (B).

The monofunctional (meth)acrylic acid derivative is not particularly limited. A known compound may be used as the monofunctional (meth)acrylic acid derivative. Examples of the monofunctional (meth)acrylic acid derivative include a (meth)acrylic acid derivative that includes a nitrogen atom, a (meth)acrylic acid derivative having an alicyclic structure, a (meth)acrylic acid derivative having an ether structure, a (meth)acrylic acid derivative that includes an aromatic ring, and the like.

The (meth)acrylic acid derivative that includes a nitrogen atom is preferable in that a cured resin formed article that exhibits more excellent heat resistance can be obtained. The (meth)acrylic acid derivative having an alicyclic structure is preferable from the viewpoint of optical properties. The (meth)acrylic acid derivative having a polyether structure is preferable from the viewpoint of toughness.

Examples of the (meth)acrylic acid derivative that includes a nitrogen atom include compounds respectively represented by the following formulas.

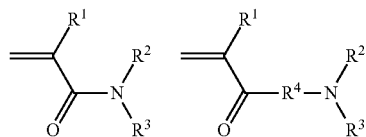

wherein $R^1$ is a hydrogen atom or an alkyl group having 1 to 6 carbon atoms, $R^2$ and $R^3$ are independently a hydrogen atom or an organic group having 1 to 12 carbon atoms, provided that $R^2$ and $R^3$ optionally bond to each other to form a cyclic structure, and $R^4$ is a divalent organic group.

Examples of the alkyl group having 1 to 6 carbon atoms represented by $R^1$ include a methyl group, an ethyl group, a propyl group, and the like. Among these, a methyl group is preferable.

Examples of the organic group having 1 to 12 carbon atoms represented by $R^2$ and $R^3$ include alkyl groups such as a methyl group, an ethyl group, and a propyl group; cycloalkyl groups such as a cyclopentyl group and a cyclohexyl group; and aromatic groups such as a phenyl group, a biphenyl group, and a naphthyl group. These groups may be substituted with a substituent at an arbitrary position. $R^2$ and $R^3$ optionally bond to each other to form a ring, which may include a nitrogen atom or an oxygen atom in its skeleton.

Examples of the divalent group represented by $R^4$ include the groups respectively represented by —NH— and —NH—$(CH_2)_p$—. Note that p is an integer from 1 to 10.

Examples of a preferable (meth)acrylic acid derivative that includes a nitrogen atom include N-(meth)acryloylmorpholine represented by the following formulas.

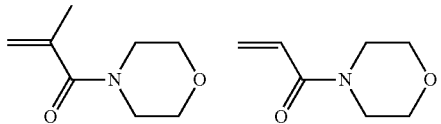

Examples of the (meth)acrylic acid derivative having an alicyclic structure include a compound represented by the following formula.

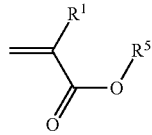

wherein $R^1$ is the same as defined above, and $R^5$ is a group having an alicyclic structure.

Examples of the group having an alicyclic structure represented by $R^5$ include a cyclohexyl group, an isobornyl group, a 1-adamantyl group, a 2-adamantyl group, a tricyclodecanyl group, and the like.

Specific examples of the (meth)acrylic acid derivative having an alicyclic structure include isobornyl(meth)acrylate, cyclohexyl(meth)acrylate, 1-adamantyl(meth)acrylate, 2-adamantyl(meth)acrylate, and the like.

Examples of the (meth)acrylic acid derivative having an ether structure include a compound represented by the following formula.

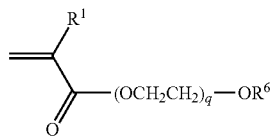

wherein $R^1$ is the same as defined above, and $R^6$ is an organic group having 1 to 12 carbon atoms. Examples of the organic group having 1 to 12 carbon atoms represented by $R^6$ include alkyl groups such as a methyl group, an ethyl group, and a propyl group; cycloalkyl groups such as a cyclopentyl group and a cyclohexyl group; and aromatic groups such as a phenyl group, a biphenyl group, and a naphthyl group. q is an integer from 2 to 20.

Specific examples of the (meth)acrylic acid derivative having an ether structure include ethoxylated o-phenylphenol (meth)acrylate, phenoxy polyethylene glycol (meth)acrylate, and the like.

Examples of the (meth)acrylic acid derivative that includes an aromatic ring include benzyl (meth)acrylate and the like.

The polyfunctional (meth)acrylic acid derivative is not particularly limited. A known compound may be used as the polyfunctional (meth)acrylic acid derivative. Examples of the polyfunctional (meth)acrylic acid derivative include a compound represented by the following formula.

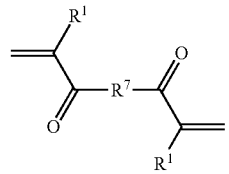

wherein $R^1$ is the same as defined above, and $R^7$ is a divalent organic group. Examples of the divalent organic group represented by $R^7$ include the groups respectively represented by the following formulas.

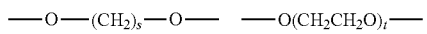
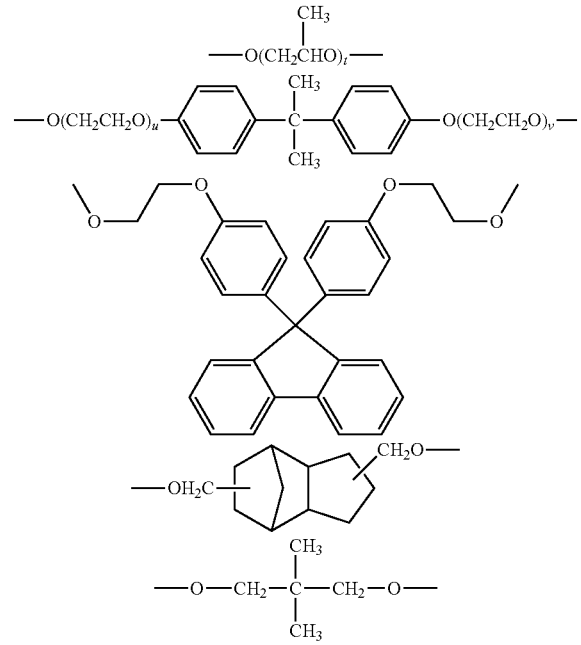

wherein s is an integer from 1 to 20, t is an integer from 1 to 30, and u and v are independently an integer from 1 to 30.

Specific examples of the polyfunctional (meth)acrylic acid derivative include tricyclodecanedimethanol di(meth)acrylate, 2-hydroxy-3-acryloyloxypropyl(meth)acrylate, polyethylene glycol di(meth)acrylate, propoxylated-ethoxylated bisphenol A di(meth)acrylate, ethoxylated bisphenol A di(meth)acrylate, 1,10-decanediol di(meth)acrylate, 1,6-hexanediol di(meth)acrylate, and the like.

Further examples of the polyfunctional (meth)acrylic acid derivative include bifunctional (meth)acrylic acid derivatives such as neopentyl glycol adipate di(meth)acrylate, hydroxypivalic acid neopentyl glycol di(meth)acrylate, caprolactone-modified dicyclopentenyl di(meth)acrylate, ethylene oxide-modified phosphoric acid di(meth)acrylate, di(acryloxyethyl) isocyanurate, and allylated cyclohexyl di(meth) acrylate; trifunctional (meth)acrylic acid derivatives such as trimethylolpropane tri(meth)acrylate, pentaerythritol tri (meth)acrylate, propionic acid-modified dipentaerythritol tri (meth)acrylate, propylene oxide-modified trimethylolpropane tri(meth)acrylate, and tris(acryloxyethyl) isocyanurate; tetrafunctional (meth)acrylic acid derivatives such as pentaerythritol tetra(meth)acrylate; pentafunctional (meth) acrylic acid derivatives such as propionic acid-modified dipentaerythritol penta(meth)acrylate; hexafunctional (meth) acrylic acid derivatives such as dipentaerythritol hexa(meth) acrylate and caprolactone-modified dipentaerythritol hexa (meth)acrylate; and the like.

Among these, the bifunctional (meth)acrylic acid derivatives are preferable as the polyfunctional (meth)acrylic acid derivative due to excellent miscibility with the thermoplastic resin (A), and a capability to suppress cure shrinkage and curling of the resulting cured product.

It is preferable to use a bifunctional (meth)acrylic acid derivative in which the divalent organic group represented by $R^7$ has a tricyclodecane skeleton. Specific examples of such a compound include tricyclodecane dimethacrylate.

These curable monomers (B) may be used either alone or in combination.

The curable resin composition preferably includes the thermoplastic resin (A) and the curable monomer (B) in a mass ratio (thermoplastic resin (A):curable monomer (B)) of 30:70 to 90:10, and more preferably 35:65 to 8:2.

When the curable resin composition includes the thermoplastic resin (A) and the curable monomer (B) in a ratio within the above range, it is possible to obtain a cured resin formed article that exhibits excellent heat resistance, includes only a small amount of residual low-boiling-point substance, and shows small in-plane retardation.

If the curable resin composition includes the curable monomer (B) so that the mass ratio (thermoplastic resin (A): curable monomer (B)) exceeds 30:70, the flexibility of the resulting cured resin formed article may deteriorate.

If the curable resin composition includes the curable monomer (B) so that the mass ratio (thermoplastic resin (A): curable monomer (B)) is less than 90:10, the plasticizing effect may not be obtained, and the amount of residual solvent may increase.

Photoinitiator (C)

The photoinitiator (C) has an absorbance at 380 nm of 0.4 or more when measured in a 0.1 mass % acetonitrile solution. The absorbance is preferably 0.8 or more, more preferably 1.0 or more, and still more preferably 1.5 or more, in order to ensure that the curing reaction proceeds efficiently. The upper limit of the absorbance is not particularly limited, but is normally 3.0 or less.

The curable resin composition according to one embodiment of the invention includes the thermoplastic resin (A) that includes an aromatic ring.

Since the aromatic ring included in the thermoplastic resin (A) absorbs ultraviolet rays having a wavelength that is normally used when curing a curable resin, the curing reaction may be hindered. However, the curable resin composition according to one embodiment of the invention includes the photoinitiator (C) that can initiate the curing reaction upon application of light having a wavelength longer than that absorbed by the aromatic ring included in the thermoplastic resin (A).

More specifically, the long-wavelength-side absorption edge of the wavelength absorbed by the aromatic ring included in the thermoplastic resin (A) is 320 to 350 nm, and the curing reaction can be initiated using light having a long wavelength by utilizing the photoinitiator (C) that shows a large absorption at a wavelength (380 nm) longer than the long-wavelength-side absorption edge of the wavelength absorbed by the aromatic ring included in the thermoplastic resin (A).

Therefore, the curing reaction proceeds efficiently although the curable resin composition according to one embodiment of the invention includes the thermoplastic resin (A) that includes an aromatic ring. This ensures that the curing reaction occurs sufficiently to obtain a cured resin formed article that exhibits high heat resistance. Since it is possible to prevent a situation in which excessive energy is applied to the resin, coloration of the cured resin formed article does not occur. Moreover, curling does not occur even when producing a film-like cured resin formed article.

Examples of the photoinitiator (C) include a phosphorus-based initiator represented by the following formula.

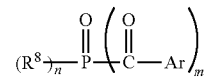

wherein $R^8$ is a substituted or unsubstituted phenyl group or a substituted or unsubstituted alkyl group having 1 to 10 carbon atoms, Ar is a substituted or unsubstituted aromatic group having 6 to 20 carbon atoms, m is an integer from 1 to 3, and n is an integer from 0 to 2, provided that m+n is 3.

When m is equal to or larger than 2, two or more corresponding groups may be either identical or different. When n is 2, two corresponding groups may be either identical or different.

Examples of a substituent that may substitute the phenyl group represented by $R^8$ include alkyl groups having 1 to 10 carbon atoms, such as a methyl group, an ethyl group, an n-propyl group, and an isopropyl group; cycloalkyl groups having 3 to 10 carbon atoms, such as a cyclopentyl group and a cyclohexyl group; alkoxy groups having 1 to 10 carbon atoms, such as a methoxy group, an ethoxy group, an n-propoxy group, and an isopropoxy group; halogen atoms such as a fluorine atom and a chlorine atom; and the like.

Examples of the alkyl group having 1 to 10 carbon atoms represented by $R^8$ include a methyl group, an ethyl group, a propyl group, an isopropyl group, an n-butyl group, an isobutyl group, a sec-butyl group, a t-butyl group, an n-pentyl group, an n-hexyl group, and the like.

Examples of a substituent that may substitute the alkyl group having 1 to 10 carbon atoms represented by $R^8$ include cycloalkyl groups having 3 to 10 carbon atoms, such as a cyclopentyl group and a cyclohexyl group; alkoxy groups having 1 to 10 carbon atoms, such as a methoxy group, an ethoxy group, an n-propoxy group, and an isopropoxy group; aromatic groups such as a phenyl group, a biphenyl group, and a naphthyl group; halogen atoms such as a fluorine atom and a chlorine atom; and the like.

Examples of the aromatic group having 6 to 20 carbon atoms represented by Ar include a phenyl group, a 1-naphthyl group, a 2-naphthyl group, an anthranyl group, and the like.

The aromatic group having 6 to 20 carbon atoms represented by Ar is preferably a phenyl group.

Examples of a substituent that may substitute the aromatic group having 6 to 20 carbon atoms represented by Ar include alkyl groups having 1 to 10 carbon atoms, such as a methyl group, an ethyl group, an n-propyl group, and an isopropyl group; cycloalkyl groups having 3 to 10 carbon atoms, such as a cyclopentyl group and a cyclohexyl group; alkoxy groups having 1 to 5 carbon atoms, such as a methoxy group, an ethoxy group, an n-propoxy group, and an isopropoxy group; halogen atoms such as a fluorine atom and a chlorine atom; and the like.

Specific examples of the photoinitiator (C) include (2,4,6-trimethylbenzoyl)diphenylphosphine oxide, bis(2,4,6-trimethylbenzoyl)phenylphosphine oxide, ethyl(2,4,6-trimethylbenzoyl)phenylphosphine oxide, bis(2,6-dimethoxybenzoyl)-2,4,4-trimethylpentylphosphine oxide, and the like.

The photoinitiator (C) may be produced, or a commercially available product may be used as the photoinitiator (C). Examples of the commercially available product that may be used as the photoinitiator (C) include Irgacure 819, Irgacure 819DW, Irgacure 1870, Irgacure 1800, DAROCURE TPO, and DAROCURE 4265 (manufactured by BASF); and SPEEDCURE TPO-L (manufactured by LAMBSON).

These photoinitiators (C) may be used either alone or in combination.

The curable resin composition preferably includes the photoinitiator (C) in a ratio of 0.05 to 15 mass %, more preferably 0.1 to 10 mass %, and still more preferably 0.3 to 5 mass %, based on the thermoplastic resin (A) and the curable monomer (B) in total.

The content of the photoinitiator (C) in the curable resin composition is preferably 1.5 mass % or more, and more preferably 2 mass % or more, based on the curable monomer (B).

When the curable resin composition includes the photoinitiator (C) in a ratio within the above range, it is possible to obtain a cured resin formed article that exhibits excellent heat resistance, includes only a small amount of residual low-boiling-point substance, and shows small in-plane retardation.

The curable resin composition according to one embodiment of the invention may include a known thermal initiator and/or a known photoinitiator in addition to the photoinitiator (C).

Examples of the thermal initiator include an organic peroxide and an azo compound.

Examples of the organic peroxide include dialkyl peroxides such as di-t-butyl peroxide, t-butylcumyl peroxide, and dicumyl peroxide; diacyl peroxides such as acetyl peroxide, lauroyl peroxide, and benzoyl peroxide; ketone peroxides such as methyl ethyl ketone peroxide, cyclohexanone peroxide, 3,3,5-trimethylcyclohexanone peroxide, and methylcyclohexanone peroxide; peroxy ketals such as 1,1-bis(t-butylperoxy)cyclohexane; hydroperoxides such as t-butyl hydroperoxide, cumene hydroperoxide, 1,1,3,3-tetramethylbutyl hydroperoxide, p-menthane hydroperoxide, diisopropylbenzene hydroperoxide, and 2,5-dimethylhexane-2,5-dihydroperoxide; peroxy esters such as t-butylperoxy acetate, t-butyl peroxy-2-ethylhexanoate, t-butyl peroxybenzoate, and t-butyl peroxyisopropylcarbonate; and the like.

Examples of the azo compound include 2,2'-azobis(4-methoxy-2,4-dimethylvaleronitrile), 2,2'-azobis(2-cyclopropylpropionitrile), 2,2'-azobis(2,4-dimethylvaleronitrile), azobisisobutyronitrile, 2,2'-azobis(2-methylbutyronitrile), 1,1'-azobis(cyclohexane-1-carbonitrile), 2-(carbamoylazo) isobutyronitrile, 2-phenylazo-4-methoxy-2,4-dimethylvaleronitrile, and the like.

Examples of the photoinitiator include alkylphenone-based photoinitiators such as 2,2-dimethoxy-1,2-diphenylethane-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-[4-[4-(2-hydroxy-2-methylpropionyl) benzyl]phenyl]-2-methylpropan-1-one, 2-methyl-1-(4-methylthiophenyl)-2-morpholinopropan-1-one, 2-benzyl-2-dimethylamino-1-(4-morpholinophenyl)butanone-1, and 2-(dimethylamino)-2-[(4-methylphenyl)methyl]-1-[4-(4-morpholinyl)phenyl]-1-butanone; titanocene-based photoinitiators such as bis($\eta^5$-2,4-cyclopentadien-1-yl)-bis[2,6-difluoro-3-(1H-pyrrol-1-yl)-phenyl]titanium; oxime ester-based photoinitiators such as 1,2-octanedione-1-[4-(phenylthio)-2-(O-benzoyloxime)] and ethanone-1-[9-ethyl-6-(2-methylbenzoyl)-9H-carbazol-3-yl]-1-(O-acetyloxime); benzophenone-based photoinitiators such as benzophenone, p-chlorobenzophenone, benzoylbenzoic acid, methyl o-benzoylbenzoate, 4-methylbenzophenone, 4-phenylbenzophenone, hydroxybenzophenone, acrylated benzophenone, 4-benzoyl-4'-methyldiphenyl sulfide, 3,3'-dimethyl-4-methoxybenzophenone, 2,4,6-trimethylbenzophenone, and 4-(13-acryloyl-1,4,7,10,13-pentaoxatridecyl)benzophenone; thioxanthone-based photo initiators such as thioxanthone, 2-chlorothioxanthone, 3-methylthioxanthone, 2,4-dimethylthioxanthone, 2,4-diisopropylthioxanthone, 2,4-dichlorothioxanthone, 1-chloro-4-propoxythioxanthone, 2-methylthioxanthone, 2-isopropylthioxanthone, and 4-isopropylthioxanthone; and the like.

The initiators may be used either alone or in combination.

A photopolymerization promoter such as triisopropanolamine or 4,4'-diethylaminobenzophenone may be used in combination with the initiator.

The curable resin composition may include an additional component as long as the object and the advantageous effects of the invention are not impaired. Examples of the additional component include a plasticizer, an antioxidant, a UV absorber, and the like.

The curable resin composition may be prepared by mixing the thermoplastic resin (A), the curable monomer (B), the photoinitiator (C), and an optional additional component, and dissolving or dispersing the mixture in an appropriate solvent, for example.

2) Curable Resin Formed Article

A curable resin formed article according to one embodiment of the invention is obtained using the curable resin composition according to one embodiment of the invention. The shape of the curable resin formed article according to one embodiment of the invention is not particularly limited. For example, the curable resin formed article may be in the shape of a film, a sheet, a rectangular parallelepiped, or the like. It is preferable that the curable resin formed article be in the shape of a film or a sheet. The curable resin formed article in the shape of a film or a sheet (film-like or sheet-like curable resin formed article) need not necessarily be a long curable resin formed article, but may be a strip-like curable resin formed article.

The film-like curable resin formed article (curable resin film) may be produced by a solution casting method using the curable resin composition. Specifically, the curable resin composition (or a solution prepared by diluting the curable resin composition with an appropriate solvent) is normally applied to a casting sheet, and the solvent is removed by drying.

The solvent is not particularly limited as long as the thermoplastic resin (A) that includes an aromatic ring, the curable monomer (B), and the photoinitiator (C) can be dissolved or dispersed therein. Examples of the solvent include aliphatic hydrocarbon-based solvents such as n-hexane and n-heptane; alicyclic hydrocarbon-based solvents such as cyclopentane and cyclohexane; aromatic hydrocarbon-based solvents such as toluene and xylene; halogenated hydrocarbon-based solvents such as methylene chloride, ethylene chloride, and dichloromethane; alcohol-based solvents such as methanol, ethanol, propanol, butanol, and propylene glycol monomethyl ether; ketone-based solvents such as acetone, methyl ethyl ketone, 2-pentanone, isophorone, and cyclohexanone; ester-based solvents such as ethyl acetate and butyl acetate; cellosolve-based solvents such ethylcellosolve; ether-based solvents such as 1,3-dioxolane; and the like.

The curable resin composition may be applied to the casting sheet using an arbitrary method. For example, a known coating method such as a spin coating method, a spray coating method, a bar coating method, a knife coating method, a roll coating method, a blade coating method, a die coating method, or a gravure coating method may be used.

A film obtained by applying the curable resin composition may be dried using an arbitrary method. For example, a known drying method such as hot-air drying, heat roll drying, or infrared irradiation may be used to obtain the curable resin film.

The drying temperature employed when drying the film is normally 30 to 150° C., and preferably 50 to 130° C. The drying time is normally 30 seconds to 5 minutes, and preferably 1 to 3 minutes. The curable resin composition according to one embodiment of the invention includes the thermoplastic resin (A) that has a very high glass transition temperature (Tg). However, the solvent can be efficiently removed due to the curable monomer (B).

The thickness of the curable resin film is not particularly limited. The thickness of the curable resin film is normally 1 to 300 μm, preferably 2 to 200 μm, and still more preferably 3 to 100 μm.

Since the curable resin composition according to one embodiment of the invention includes the curable monomer (B) having a plasticizing effect, the glass transition temperature (Tg) of the curable resin composition is normally −40 to 135° C., and preferably −40 to 130° C. Since the curable resin composition has such a low glass transition temperature (Tg), the solvent can be efficiently removed during the drying step when producing the curable resin film using a solution casting method. Therefore, a cured resin formed article that rarely curls can be obtained by curing the curable resin film according to one embodiment of the invention.

3) Cured Resin Formed Article

A cured resin formed article according to one embodiment of the invention is obtained by curing the curable resin formed article according to one embodiment of the invention. The curing method is described in detail later in connection with the method for producing a cured resin formed article.

The shape of the cured resin formed article according to one embodiment of the invention is not particularly limited. For example, the cured resin formed article may be in the shape of a film, a sheet, pellets, a rectangular parallelepiped, or the like. It is preferable that the cured resin formed article be in the shape of a film or a sheet. The cured resin formed article in the shape of a film or a sheet (film-like or sheet-like cured resin formed article) need not necessarily be a long cured resin formed article, but may be a strip-like cured resin formed article. The film-like or sheet-like cured resin formed article according to one embodiment of the invention may be hereinafter referred to as "cured resin film".

The thickness of the cured resin formed article is not particularly limited, and may be determined taking account of the intended use. The thickness of the cured resin formed article is normally 1 to 300 μm, preferably 2 to 200 μm, and still more preferably 3 to 100 μm.

The glass transition temperature (Tg) of the cured resin formed article according to one embodiment of the invention is normally 140° C. or more, and preferably 150° C. or more (i.e., the cured resin formed article exhibits excellent heat resistance).

When the glass transition temperature (Tg) of the cured resin formed article is 140° C. or more (i.e., when the cured resin formed article exhibits excellent heat resistance), the cured resin formed article can preferably be used when a laminate according to one embodiment of the invention (described later) is used for an electronic device.

It is preferable that the cured resin formed article according to one embodiment of the invention be colorless and transparent. Since the photoinitiator (C) functions when producing the cured resin formed article according to one embodiment of the invention, the curing reaction proceeds efficiently. Therefore, excessive irradiation can be avoided, and a deterioration in the resin can be suppressed. This makes it possible to obtain a colorless and transparent cured resin formed article.

The dose may be increased when it is desired to further increase the efficiency of the curing reaction. In this case, it is preferable to provide an active energy ray irradiation apparatus with a filter so that only light having a wavelength necessary for the curing reaction is applied. A resin film (e.g., polyethylene terephthalate film) that does not allow light having a wavelength unnecessary for the curing reaction may be used instead of the UV-cut filter.

For example, when active energy rays are applied to the curable resin formed article in a state in which a polyethylene terephthalate film (PET film) is stacked on the curable resin formed article, light having a wavelength unnecessary for the curing reaction does not pass through the PET film, and a deterioration in the resin or coloration of the cured resin formed article can be prevented even when effecting the curing reaction at an increased dose.

The cured resin film according to one embodiment of the invention includes a curing reaction product of the thermoplastic resin (A) and the curable monomer (B), and has small in-plane retardation. The cured resin film according to one embodiment of the invention normally has an in-plane retardation of 20 nm or less, preferably 15 nm or less, more preferably 10 nm or less, and still more preferably 5 nm or less.

When the in-plane retardation is within the above range, the cured resin film according to one embodiment of the invention can suitably be used as an optical sheet material.

Since the cured resin formed article according to one embodiment of the invention is obtained by curing the curable resin composition according to one embodiment of the invention that includes the photoinitiator (C), a situation does not occur in which the curable monomer (B) remains unreacted, and the heat resistance of the cured resin formed article deteriorates.

The mass reduction ratio of the cured resin formed article according to one embodiment of the invention when the cured resin formed article is subjected to a temperature of 150° C. for 30 minutes is normally 2% or less, preferably 1.5% or less, and more preferably 1.0% or less.

When the mass reduction ratio is within the above range, the cured resin formed article according to one embodiment of the invention does not curl, and can suitably be used as an optical sheet material.

The cured resin formed article according to one embodiment of the invention is obtained using a combination of the thermoplastic resin (A) and the curable monomer (B), has excellent heat resistance, includes only a small amount of residual solvent, and has small in-plane retardation.

The cured resin formed article according to one embodiment of the invention is obtained using a combination of the thermoplastic resin (A) and the photoinitiator (C), and the curable monomer (B) does not remain unreacted in the cured resin formed article due to the above combination. Therefore, the cured resin formed article exhibits excellent heat resistance.

4) Method for Producing Cured Resin Formed Article

The cured resin formed article according to one embodiment of the invention may be produced using an arbitrary method. The cured resin formed article according to one embodiment of the invention may be produced using a known method. For example, the cured resin formed article may be produced using a method that extrudes the curable resin composition, and cures the resulting formed body by applying active energy rays or the like, or a method that forms the curable resin composition using a solution casting method to obtain a film-like formed body, and cures the film-like formed body by applying active energy rays or the like. It is preferable to use the latter method since in-plane retardation can be reduced.

When producing a film-like cured resin formed article (cured resin film), it is preferable to produce the cured resin formed article using a casting sheet since the cured resin formed article can be efficiently produced, and the resulting cured resin film can be protected during storage, transportation, and the like.

When producing the cured resin formed article in the shape of a film or a sheet, the cured resin formed article may include a casting sheet. The casting sheet is removed in a given step. When the cured resin film according to one embodiment of the invention includes a casting sheet, the handling capability of the cured resin film does not deteriorate even when the cured resin film has a small thickness.

When using a casting sheet, the cured resin film may be produced using a method that includes the following steps 1 and 2, for example.

Step 1: A step that forms a curable resin layer on a casting sheet, the curable resin layer being formed of a curable resin composition that includes the thermoplastic resin (A), the curable monomer (B), and the photoinitiator (C)

Step 2: A step that cures the curable resin layer obtained by the step 1 to form a cured resin layer In the step 1, the curable resin layer may be formed using the method described above in connection with the curable resin formed article according to one embodiment of the invention.

For example, the curable resin composition that includes the thermoplastic resin (A) and the curable monomer (B) (or a solution prepared by diluting the curable resin composition with an appropriate solvent) is applied to the casting sheet, and the solvent is removed by drying to form the curable resin layer.

In the step 2, the curable resin layer may be cured using the method described above in connection with the cured resin formed article according to one embodiment of the invention to form the cured resin layer.

For example, when the curable resin composition includes a photoinitiator, it is preferable to cure the curable resin layer by applying active energy rays.

The active energy rays are preferably light having a wavelength of 200 to 400 nm, and more preferably light having a wavelength of 320 to 400 nm.

The active energy rays are preferably applied at an intensity of 50 to 1000 mW/cm$^2$. The active energy rays are preferably applied at a dose of 50 to 10,000 mJ/cm$^2$, and more preferably 1000 to 10,000 mJ/cm$^2$.

The irradiation time is 0.1 to 1000 seconds, preferably 1 to 500 seconds, and more preferably 10 to 100 seconds. The active energy rays are preferably applied a plurality of times so that the dose falls within the above range taking account of the thermal load during the irradiation step.

It is preferable to apply the active energy rays to the curable resin layer through a filter that blocks light having a wavelength of 320 nm or less so that only light having a wavelength necessary for the curing reaction is applied to the curable resin layer in order to prevent a deterioration in the thermoplastic resin (A). In this case, since light having a wavelength of 320 nm or less that is unnecessary for the curing reaction does not pass through the filter, a deterioration in the thermoplastic resin (A) or coloration of the cured resin formed article can be prevented.

A resin film (e.g., polyethylene terephthalate film) may be used instead of the filter.

In this case, the resin film may be stacked on the curable resin layer before the step 2.

A cured resin film provided with the casting sheet can be obtained using the above method.

The casting sheet is normally removed in a given step taking account of the application of the cured resin film. Although the method that includes the steps 1 and 2 forms the cured resin film utilizing the casting sheet, the cured resin film obtained by the method may or may not include the casting sheet.

5) Laminate

A laminate according to one embodiment of the invention includes at least one layer that is formed of a cured resin obtained by curing the curable resin composition according to one embodiment of the invention.

The laminate according to one embodiment of the invention may include an additional layer. The additional layer that may be included in the laminate is not particularly limited. Examples of the additional layer include a hard coat layer, a refractive index-adjusting layer, a primer layer, an optical diffusion layer, an anti-glare treatment layer, a gas barrier layer, a transparent conductive layer, a casting sheet, and the like.

The hard coat layer is provided to implement an improvement in scratch resistance and the like. The hard coat layer is obtained by forming a cured film on the surface of the cured resin film using a curable resin, for example. Examples of the curable resin include UV-curable resins such as a silicon-based resin, a urethane-based resin, an acrylic-based resin, and an epoxy-based resin, and the like.

The refractive index-adjusting layer is provided to control reflection. The refractive index-adjusting layer may be formed using a high-refractive-index material or a low-refractive-index material so that the desired performance is obtained.

The primer layer is provided to improve surface adhesion. The primer layer may be formed using a known method.

The optical diffusion layer is provided to diffuse light, and can increase the viewing angle of a liquid crystal display and the like. The optical diffusion layer may be formed using a known method.

The anti-glare treatment layer is provided to prevent a situation in which it is difficult to observe the transmitted light due to reflection of external light from the surface of the cured resin film, for example. The anti-glare treatment layer may be formed by a known method using a filler (e.g., silica particles).

The gas barrier layer suppresses transmission of oxygen and water vapor. Examples of the gas barrier layer include a layer that is formed of an inorganic deposited film, a layer that includes a gas barrier resin, a layer obtained by implanting ions into a layer that includes a polymer compound, and the like. The gas barrier layer may be formed using a known method.

The transparent conductive layer is transparent, and exhibits conductivity. Examples of a material for forming the transparent conductive layer include semiconducting metal oxides such as indium tin oxide (ITO) and indium zinc oxide (IZO). The transparent conductive layer may be formed by an evaporation (deposition) method, a sputtering method, an ion plating method, a thermal CVD method, a plasma CVD method, or the like.

The casting sheet is normally stacked as the outermost layer of the cured resin film, and protects the cured resin film during storage, transportation, and the like. The casting sheet is removed in a given step. A plastic film such as a polyethylene terephthalate film may be used directly as the casting sheet, or the casting sheet may be prepared by applying a release agent to paper, a plastic film, or the like to form a release agent layer.

The thickness of the laminate according to one embodiment of the invention is not particularly limited, and may be appropriately determined taking account of the application of the desired electronic device and the like. The substantial thickness of the laminate is normally 1 to 300 μm, preferably 2 to 200 μm, and still more preferably 3 to 100 μm.

The term "substantial thickness" used herein refers to the thickness of the laminate in a usage state. Specifically, when the laminate according to one embodiment of the invention includes the casting sheet and the like, the thickness of the part (e.g., casting sheet) that is removed before use is excluded from the substantial thickness.

The laminate according to one embodiment of the invention may suitably be used as an electrode material for a touch panel and the like, a flat-screen television, an optical recording medium, and an optical sheet material.

EXAMPLES

The invention is further described below by way of examples. Note that the invention is not limited to the following examples.

Example 1

60 parts by mass of pellets of a polyarylate-based resin (PAR) ("U-Polymer P-1001A" manufactured by Unitika Ltd., Tg=195° C.) were dissolved in dichloromethane to prepare a 15 mass % solution. 39 parts by mass of N-acryloylmorpholine ("ACMO" manufactured by Kohjin Co., Ltd.) and 1 part by mass of bis(2,4,6-trimethylbenzoyl)phenylphosphine oxide ("Irgacure 819" manufactured by BASF) were added to the solution to prepare a curable resin composition A.

The curable resin composition A was applied to the surface of a polyethylene terephthalate (PET) film ("PET 50A-4100" manufactured by Toyobo Co., Ltd., thickness: 50 μm) (casting sheet) opposite to the primer layer using a fountain die method so that the thickness after drying was 50 μm. The resulting film was heated (dried) at 50° C. for 2 minutes and at 130° C. for 2 minutes to obtain a curable resin film A provided with the casting sheet.

After stacking a PET film ("PET 50A-4100" manufactured by Toyobo Co., Ltd., thickness: 50 μm) on the curable resin film A in order to block light having a wavelength of 320 nm or less, ultraviolet rays were applied to the curable resin film A using a belt conveyer-type UV irradiation apparatus ("ECS-401GX" manufactured by Eye Graphics Co., Ltd.) and a high-pressure mercury lamp ("H04-L41" manufactured by Eye Graphics Co., Ltd.) (height of UV lamp: 150 mm, output of UV lamp: 3 kW (120 mW/cm), wavelength: 365 nm, intensity: 271 mW/cm$^2$, dose: 500 mJ/cm$^2$ (UV meter: "UV-351" manufactured by ORC Manufacturing Co., Ltd.). Next, ultraviolet rays were applied twice using the UV irradiation apparatus (height of UV lamp: 150 mm, wavelength: 365 nm, intensity: 271 mW/cm$^2$, dose: 1000 mJ/cm$^2$) to effect a curing reaction to obtain a cured resin film A provided with the casting sheet. The total UV dose was 2500 mJ/cm$^2$. Note that the cured resin film from which the PET film was removed, was used as the measurement sample.

Examples 2 to 6 and Comparative Example 1

Curable resin compositions B to G were prepared in the same manner as in Example 1, except that each component was used in the amount shown in Table 1. Cured resin films B to G provided with a casting sheet were obtained in the same manner as in Example 1, except that the curable resin compositions B to G were respectively used.

The details of the compounds used in Examples 2 to 6 and Comparative Example 1 are shown below.

Thermoplastic Resin
PAR: polyarylate-based resin ("U-Polymer P-1001A" manufactured by Unitika Ltd., Tg=195° C.)
PES: polyethersulfone-based resin ("ULTRASON E 2010" manufactured by BASF, Tg=225° C.)
PSF: polysulfone-based resin ("ULTRASON S 3010" manufactured by BASF, Tg=180° C.)
PC: polycarbonate-based resin ("Tarflon LS1700" manufactured by Idemitsu Kosan Co., Ltd., Tg=145° C.)

Monofunctional Monomer
ACMO: N-acryloylmorpholine (manufactured by Kohjin Co., Ltd.)
ALEN: ethoxylated o-phenylphenol acrylate ("A-LEN-10" manufactured by
    Shin-Nakamura Chemical Co., Ltd.)

Polyfunctional Monomer
ADCP: tricyclodecanedimethanol diacrylate ("ADCP" manufactured by Shin-Nakamura Chemical Co., Ltd.)
ABE: ethoxylated bisphenol A diacrylate ("ABE-300" manufactured by Shin-Nakamura Chemical Co., Ltd.)

Initiator
Initiator 1: bis(2,4,6-trimethylbenzoyl)phenylphosphine oxide ("Irgacure 819" manufactured by BASF (absorbance at 380 nm in 0.1% acetonitrile solution: 1.9))
Initiator 2: (2,4,6-trimethylbenzoyl)diphenylphosphine oxide ("DAROCURE TPO" manufactured by BASF (absorbance at 380 nm in 0.1% acetonitrile solution: 1.6))

Initiator 3: ethyl(2,4,6-trimethylbenzoyl)phenylphosphine oxide ("SPEEDCURE TPO-L" manufactured by LAMBSON (absorbance at 380 nm in 0.1% acetonitrile solution: 1.6))
Initiator 4: mixture of bis(2,6-dimethoxybenzoyl)-2,4,4-trimethylpentylphosphine oxide and 1-(hydroxycyclohexyl) phenyl ketone ("Irgacure 1800" manufactured by BASF (absorbance at 380 nm in 0.1% acetonitrile solution: 0.4))
Initiator 5: 1-(hydroxycyclohexyl) phenyl ketone ("Irgacure 184" manufactured by BASF (absorbance at 380 nm in 0.1% acetonitrile solution: 0.1))

Comparative Example 2

A resin film (thickness: 50 μm) was formed by a melt extrusion method using pellets of a polyarylate-based resin ("U-Polymer P-1001A" manufactured by Unitika Ltd., Tg=195° C.).

Comparative Example 3

Pellets of a polyarylate-based resin ("U-Polymer P-1001A" manufactured by Unitika Ltd., Tg=195° C.) were dissolved in dichloromethane to prepare a 15 wt % solution.
The solution was applied to the surface of a polyethylene terephthalate (PET) film ("PET 50A-4100" manufactured by Toyobo Co., Ltd., thickness: 50 μm) (casting sheet) opposite to the primer layer using a fountain die method so that the thickness after drying was 50 μm. The resulting film was heated (dried) at 50° C. for 2 minutes and at 130° C. for 2 minutes to obtain a film.

In-Plane Retardation of Cured Resin Film

The in-plane retardation of the cured resin films A to G obtained in the examples and comparative examples (from which the casting sheet had been removed) was measured.
The in-plane retardation was measured at 23° C. using a retardation measurement apparatus ("KOBRA-WR" manufactured by Oji Scientific Instruments). The in-plane retardation was measured at a wavelength of 589 nm. The results are shown in Table 1.
Table 1 also shows the in-plane retardation of the films obtained in Comparative Examples 2 and 3.

Mass Reduction Ratio of Cured Resin Film

The amount of residual low-boiling-point substance (e.g., solvent and curable monomer) in the cured resin films A to G obtained in the examples and comparative examples (from which the casting sheet had been removed) was evaluated by measuring the mass reduction ratio when the sample (20 mg) was allowed to stand at 150° C. for 30 minutes using a thermogravimetry/differential thermal analyzer (TG/DTA) ("DTG-60" manufactured by Shimadzu Corporation). The results are shown in Table 1.
Table 1 also shows the mass reduction ratio of the films obtained in Comparative Examples 2 and 3

Curling of Cured Resin Film

The degree of curling of the cured resin films A to G obtained in the examples and comparative examples (from which the casting sheet had been removed) was evaluated by measuring the height (mm) of each corner of the cured resin films A to G (100×100 mm) placed on a flat surface. The degree of curling (mm) was evaluated based on the total height of the four corners. The results are shown in Table 1.
Table 1 also shows the degree of curling of the films obtained in Comparative Examples 2 and 3.

Glass Transition Temperature (Tg)

The curable resin films A to G obtained in the examples and comparative examples, and the cured resin films A to G obtained in the examples and comparative examples (from which the casting sheet had been removed) were subjected to viscoelasticity measurement (frequency: 11 Hz, temperature increase rate 3° C./min, temperature range: 0 to 250° C., tensile mode) using a viscoelasticity measurement apparatus ("DMA Q800" manufactured by TA Instruments Japan Inc.). The temperature corresponding to the maximum tan δ value (loss modulus/storage modulus) obtained by the viscoelasticity measurement was taken as the glass transition temperature (Tg). The results are shown in Table 1.
Table 1 also shows the glass transition temperature (Tg) of the films obtained in Comparative Examples 2 and 3.

TABLE 1

| | | | Example | | | | | | Comparative Example | | |
|---|---|---|---|---|---|---|---|---|---|---|---|
| | | | 1 | 2 | 3 | 4 | 5 | 6 | 1 | 2 | 3 |
| Thermoplastic resin (A) | | PAR (Tg = 195° C.) | 60 | 70 | — | — | — | — | 60 | 100 | 100 |
| | | PES (Tg = 225° C.) | — | — | 70 | — | — | — | — | — | — |
| | | PSF (Tg = 180° C.) | — | — | — | 60 | 30 | — | — | — | — |
| | | PC (Tg = 145° C.) | — | — | — | — | — | 90 | — | — | — |
| Curable monomer (B) | Monofunctional monomer | ACMO | 39 | — | — | 19 | — | — | 37 | — | — |
| | | ALEN | — | — | — | — | — | 4 | — | — | — |
| | Polyfunctional monomer | ADCP | — | 29 | 27 | 18 | 67 | — | — | — | — |
| | | ABE | — | — | — | — | — | 3 | — | — | — |
| Photoinitiator (C) | | Initiator 1 (absorbance: 1.9) | 1 | 1 | — | — | — | — | — | — | — |
| | | Initiator 2 (absorbance: 1.6) | — | — | 3 | — | — | 3 | — | — | — |
| | | Initiator 3 (absorbance: 1.6) | — | — | — | 3 | — | — | — | — | — |
| | | Initiator 4 (absorbance: 0.4) | — | — | — | — | 3 | — | — | — | — |
| Photoinitiator | | Initiator 5 (absorbance: 0.1) | — | — | — | — | — | — | 3 | — | — |
| Cured resin film | | | A | B | C | D | E | F | G | — | — |
| In-plane retardation (nm) | | | 3 | 4 | 6 | 3 | 5 | 7 | 4 | 20 | 10 |
| Mass reduction ratio (%) | | | 0.8 | 1 | 1.1 | 0.7 | 0.7 | 1.1 | 1 | 0.1 | 4.5 |
| Degree of curling (mm) | | | 2 | 3 | 3 | 2 | 3 | 6 | 3 | 2 | 30 |
| Glass transition temperature (° C.) of cured resin film | | | 170 | 185 | 171 | 179 | 155 | 140 | 110 | 195 | 195 |
| Glass transition temperature (° C.) of curable resin film | | | 43 | 60 | 80 | 40 | 0 | 120 | 43 | — | — |

The cured resin films A to F obtained in Examples 1 to 6 had small in-plane retardation. Since the cured resin films A to F had a small mass reduction ratio and a low degree of curling, it is considered that the solvent was almost completely removed during the drying step. The cured resin films A to F had a high glass transition temperature, and showed excellent heat resistance.

The cured resin film G obtained in Comparative Example 1 in which the photoinitiator (C) was not used had a low glass transition temperature due to an insufficient curing reaction.

The film obtained in Comparative Example 2 that was produced using the melt extrusion method had large in-plane retardation.

The film obtained in Comparative Example 3 that was produced using only the solution casting method had a large mass reduction ratio and a high degree of curling since the solvent was not sufficiently removed. Since the film obtained in Comparative Example 3 did not include a reaction product of the curable monomer (B), the film obtained in Comparative Example 3 had large in-plane retardation.

The invention claimed is:

1. A curable resin composition comprising a thermoplastic resin (A), a curable monomer (B), and a photoinitiator (C),
    the thermoplastic resin (A) being a polysulfone-based resin or a polyarylate-based resin or both, including an aromatic ring in its molecule, and having a glass transition temperature (Tg) of 140° C. or more, and
    the photoinitiator (C) having an absorbance at 380 nm of 0.4 or more when measured in a 0.1 mass % acetonitrile solution.

2. The curable resin composition according to claim 1, wherein the photoinitiator (C) is a phosphorus-based photoinitiator represented by the following formula,

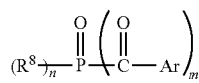

wherein $R^8$ is a substituted or unsubstituted phenyl group or a substituted or unsubstituted alkyl group having 1 to 10 carbon atoms, Ar is a substituted or unsubstituted aromatic group having 6 to 20 carbon atoms, m is an integer from 1 to 3, and n is an integer from 0 to 2, provided that m+n is 3.

3. The curable resin composition according to claim 1, the curable resin composition including the thermoplastic resin (A) and the curable monomer (B) in a mass ratio (thermoplastic resin (A):curable monomer (B)) of 3:7 to 9:1.

4. The curable resin composition according to claim 1, the curable resin composition including the photoinitiator (C) in a ratio of 0.05 to 15 mass % based on the thermoplastic resin (A) and the curable monomer (B) in total.

5. A curable resin formed article obtained by forming the curable resin composition according to claim 1.

6. The curable resin formed article according to claim 5, the curable resin formed article being a film-like article.

7. A cured resin formed article obtained by curing the curable resin formed article according to claim 5.

8. A method for producing the cured resin formed article according to claim 7, the method comprising:
    a step 1 that forms a curable resin layer on a casting sheet, the curable resin layer being formed of the curable resin composition that includes the thermoplastic resin (A), the curable monomer (B), and the photoinitiator (C); and
    a step 2 that cures the curable resin layer obtained by the step 1 to form a cured resin layer.

9. The method according to claim 8, wherein the step 2 cures the curable resin layer by applying active energy rays at a dose of 50 to 10,000 mJ/cm$^2$ to the curable resin layer.

10. The method according to claim 9, wherein the step 2 applies the active energy rays to the curable resin layer through a filter that blocks light having a wavelength of 320 nm or less.

11. A laminate comprising at least one layer that is formed of a cured resin obtained by curing the curable resin composition according to claim 1.

12. The curable resin composition according to claim 2, the curable resin composition including the thermoplastic resin (A) and the curable monomer (B) in a mass ratio (thermoplastic resin (A):curable monomer (B)) of 3:7 to 9:1.

13. The curable resin composition according to claim 2, the curable resin composition including the photoinitiator (C) in a ratio of 0.05 to 15 mass % based on the thermoplastic resin (A) and the curable monomer (B) in total.

14. The curable resin composition according to claim 3, the curable resin composition including the photoinitiator (C) in a ratio of 0.05 to 15 mass % based on the thermoplastic resin (A) and the curable monomer (B) in total.

* * * * *